2,847,378

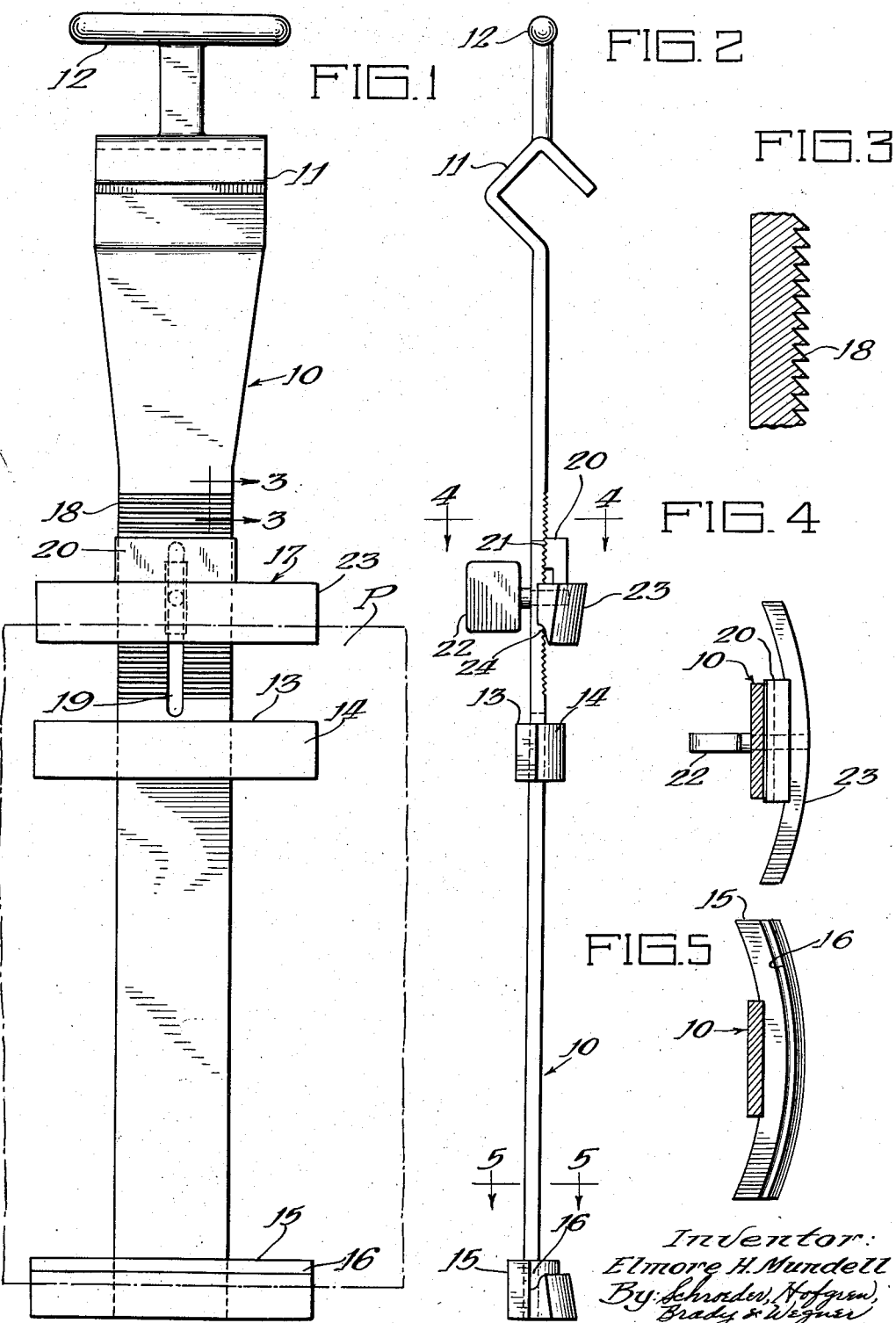

Patented Aug. 12, 1958

2,847,378

RACK FOR SUPPORTING AN ELECTROTYPE PLATE DURING PLATING

Elmore H. Mundell, Gary, Ind., assignor to R. R. Donnelley & Sons Company, a corporation of Delaware Application May 7, 1954, Serial No. 428,176

1 Claim. (Cl. 204—297)

This invention relates to an improved rack for supporting an electrotype plate during plating, and in particular it relates to a rack which fits plates of various sizes and provides firm electric contact with the plate over a large area.

The principal object of the invention is to provide a plating rack for electrotype plates which is simple, durable, provides firm electric contact with the plate over a large area, and which fits plates of various sizes.

A further object of the invention is to provide a plating rack which has a sliding clamp to adapt it to plates of various sizes.

Another object of the invention is to provide a rack which has an electric contact member provided with an arcuate face which presents a large surface in electric contact with the rear of a curved type plate.

The invention is illustrated in a preferred embodiment in the accompanying drawings, in which:

Fig. 1 is a front elevational view of the invention;

Fig. 2 is a side elevational view thereof;

Fig. 3 is a fragmentary enlarged section taken as indicated along the line 3—3 of Fig. 1;

Fig. 4 is a section taken as indicated along the line 4—4 of Fig. 2; and

Fig. 5 is a section taken as indicated along the line 5—5 of Fig. 2.

Referring to the drawings in greater detail, the plating rack comprises a metal rack bar 10, of brass or the like, which has a hook 11 adjacent its upper end and a handle 12 by means of which it may be conveniently carried. The hook 11 is adapted to support the rack on an electric conductor member such as a bus bar above a plating tank, and make electric contact with the conductor member upon which it is hung. Welded to the face of the rack bar 10 is an electric contact member 13 which extends transversely of the rack bar and has an arcuate forward face 14 which is curved to fit the back of an electrotype plate P, shown in broken lines in Fig. 1. The electric contact member 13 provides firm electric contact over a substantial area with the back of the electrotype plate P.

At the bottom of the rack bar 10 is an arcuate transverse plate supporting ledge member 15, which is provided with a groove 16 to receive the lower marginal portion of the electrotype plate P, the ledge 15 and electric contact 13 being so arranged that when the electrotype plate P is supported on the ledge the rear surface of the plate is in contact with the electric conductor member. The faces of the groove 16 which contact the plate are covered with a dielectric film which is resistant to the chromium plating electrolyte, so that the groove dimensions will remain constant by preventing chromium from plating out on the protected surfaces. A pressure sensitive tape may conveniently be used for this purpose.

Above the electric contact member 13 is a clamp means, indicated generally at 17, which is slidably mounted on the rack bar. To accommodate the clamp means 17, the rack bar has a series of parallel horizontal teeth 18, and a central longitudinal slot 19.

The clamp means 17 includes a clamp finger 20 which has a sawtooth face 21 to mate with the teeth 18 of the rack bar 10, and a thumb screw 22 which extends through the longitudinal slot 19 of the rack bar and into a threaded opening in the base of the finger 20. Extending downwardly from the finger 20 is an arcuate clamp block 23 which, as best seen in Fig. 2, has a recessed rear face which is adapted to engage the upper margin of an electrotype plate P so as to hold the plate in the groove 16 of the support ledge 15 with its rear face firmly against the contact member 13. Like the groove 16, the plate contacting surface of the clamp block 23 is protected by a strip of dielectric material. The slidable mounting of the clamp means 17, permitted by reason of the thumb screw 22 and slot 19, combined with the saw teeth 18 of the rack bar and the mating teeth 21 of the clamp finger 20, permits the electroplating rack to be adapted to plates of various sizes.

An electrotype plate P is mounted in the rack by setting its lower margin in the groove 16 of the ledge 15, the clamp means 17 is adjusted longitudinally of the rack bar 10 to engage the clamp block 23 with the upper margin of the plate to hold it in place, and the thumb screw 22 is tightened so as to engage the saw teeth 21 of the clamp finger with the transverse teeth 18 of the rack bar. Thus, the rear face of the plate P is held in firm electric contact with the metal face of the contact member 13; and since the contact member has a forward face 14 which fits the back of the plate P, electric contact over an adequate area is assured so that there is ample current flow to the plate which serves as the cathode of an electroplating circuit when it is in the plating bath. The circuit for the plate is completed by hooking the hook 11 over the electric conductor bus bar of the plating tank, so that the plate P is electroplated in the customary fashion.

The foregoing detailed description is given for clearness of understanding only and no unnecessary limitations are to be understood therefrom, as some modifications will be obvious to those skilled in the art.

I claim:

A rack for supporting a curved electrotype plate during plating, comprising: a vertically elongated, relatively narrow rack bar which has a metal hook at its upper end portion for engagement with an electric conductor member to suspend the rack vertically, said rack bar having a longitudinal slot; a series of transverse teeth on the rack bar; an elongated metal contact member on and intermediate the upper and lower ends of the rack bar which is in electric communication with the hook and has an arcuate forward face of substantial area adapted to make a substantially continuous surface contact with the back of a curved electrotype plate; an arcuate, transverse ledge member at the lower end of the rack bar to support an electrotype plate with its rear surface in contact with the face of the conductor member, said ledge member having upstanding means at its forward margin to engage the lower marginal portion of a plate; and clamp means vertically slidably mounted on the rack bar above the contact member, said clamp means including a clamp block having an arcuate rear face with overhanging lip means at the front, a toothed finger which extends upwardly from the clamp block, and screw means to draw the lip means of the clamp block rearwardly into firm clamping engagement with the top marginal portion of a plate which is on the ledge member and press said plate into firm electric contact with the contact member, and to engage the toothed finger with the teeth on the rack bar.

References Cited in the file of this patent

UNITED STATES PATENTS

| | | |
|---|---|---|
| 1,747,165 | Eaton | Feb. 18, 1930 |
| 2,533,464 | Jasper | Dec. 12, 1950 |
| 2,637,689 | Myers | May 5, 1953 |

FOREIGN PATENTS

| | | |
|---|---|---|
| 350,658 | Great Britain | June 18, 1931 |